(12) United States Patent
Kosugi et al.

(10) Patent No.: US 6,483,483 B2
(45) Date of Patent: Nov. 19, 2002

(54) EYEGLASSES TYPE IMAGE DISPLAY APPARATUS

(75) Inventors: Ichiro Kosugi, Tokyo; Yoshio Okoshi, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/268,376

(22) Filed: Mar. 15, 1999

(65) Prior Publication Data

US 2002/0067367 A1 Jun. 6, 2002

(30) Foreign Application Priority Data

Mar. 18, 1998 (JP) .......................................... 10-068209

(51) Int. Cl.[7] .................................................. G09G 5/00
(52) U.S. Cl. ................................................. 345/8; 345/9
(58) Field of Search ..................................... 345/7, 8, 9

(56) References Cited

U.S. PATENT DOCUMENTS

| | | | | |
|---|---|---|---|---|
| 5,451,976 A | * | 9/1995 | Ito ................................. | 345/8 |
| 5,793,339 A | * | 8/1998 | Takahashi ....................... | 345/7 |
| 5,808,802 A | * | 9/1998 | Hur ............................... | 359/630 |
| 5,844,530 A | * | 12/1998 | Tosaki ........................... | 345/7 |
| 5,844,656 A | * | 12/1998 | Ronzani et al. ................ | 351/158 |
| 5,977,935 A | * | 11/1999 | Yasukawa et al. ............. | 340/980 |
| 5,982,343 A | * | 11/1999 | Iba et al. ........................ | 345/8 |
| 6,046,712 A | * | 4/2000 | Beller et al. .................... | 345/8 |
| 6,091,546 A | * | 7/2000 | Spitzer ........................... | 345/8 |
| 6,150,998 A | * | 11/2000 | Travers et al. ................. | 345/8 |
| 6,320,559 B1 | * | 11/2001 | Yasukawa et al. ............. | 345/158 |

* cited by examiner

Primary Examiner—Vijay Shankar
Assistant Examiner—Nitin Patel
(74) Attorney, Agent, or Firm—Oblon, Spivak, McClelland, Maier & Neustadt, P.C.

(57) ABSTRACT

An eyeglasses type image display apparatus can be connected to a computer having a large amount of information so that it can display information from the computer on a large screen. The apparatus is adapted to be mounted on a head of a user to display an image in front of eyes of the user, and includes a connector capable of receiving information from a computer, a processor for processing the information, and a display unit for displaying an image based on the information processed. The connector includes a wire or a radio section for transmitting information. The display unit can display an image and has a see-through function for allowing the user to see the external world therethrough.

4 Claims, 8 Drawing Sheets

EYEGLASSES TYPE IMAGE DISPLAY APPARATUS

BACKGROUND OF THE INVENTION

This invention relates to an eyeglasses type image display apparatus, and more particularly to an eyeglasses type image display apparatus which is connectable to a computer by a wire or by radio.

A known eyeglasses type image display apparatus (or head mounted display apparatus) displays an image inputted from an apparatus into which a video medium can be loaded such as a video apparatus, in such a manner that a user can see and feel the image of video or the like as if a large powerful screen of a 50-inch size is present at a distance of several meters (approximately 2 meters) forwardly.

The eyeglasses type image display apparatus basically includes a ring and a display section. A pad is provided on the ring so that, by fitting the ring on the head of the user such that the pad is pressed against the forehead of the user, the user can mount the display apparatus just in such a feeling as to wear eyeglasses.

Meanwhile, popularization of a computer such as a notebook type computer has been accelerated, and this increases occasions for a user to carry out and use a computer casually.

The computer includes a display unit and an inputting apparatus such as a keyboard. Data inputted from the keyboard are displayed on the display unit.

In order to perform an inputting operation in a word processor application software on a computer, information intended by the user is inputted through the keyboard and displayed on the display unit so that the input operation is proceeded while the displayed information is confirmed.

However, since the display unit and the keyboard of the computer are physically separate from each other, the user cannot simultaneously perform an input operation through the keyboard and observation of the display screen. Therefore, the computer has a problem in that it is inferior in interface with its user.

Further, while a compact computer having a card-like configuration has been developed in recent years, since the display unit is large in size, there is another problem that it is difficult to make the computer compact in size.

Accordingly, the computer has a subject which has to be solved in operability of the display unit, keyboard and so forth.

SUMMARY OF THE INVENTION it is thus an object of the present invention to provide an eyeglasses type image display apparatus which allows connection thereof to a computer having a large amount of information so that it can display information from the computer on a large screen.

In order to attain the object described above, according to the present invention, there is provided an eyeglasses type image display apparatus for being mounted on a head of a user to display an image in front of eyes of the user, comprising a connection means capable of receiving information from a computer therethrough, a processing means for processing the information received by the connection means, and a display means for displaying an image based on the information processed by the processing means.

With the eyeglasses type image display apparatus, since it can be connect ed to a computer, there is an advantage that abundant information available or decodable by the computer can be observed not on a computer screen but on a body sensory large screen.

The connection means may include a radio means for transmission information. In this instance, the eyeglasses type image display apparatus can be connected to a computer by radio. Here, if information to be displayed on a display unit of the computer is displayed on the eyeglasses type image display apparatus, then the display unit of the computer can be omitted. Consequently, there is an advantage that the computer can be made compact or the degree of freedom in designing the display unit of the computer can be enhanced.

Preferably, the display means has a function for displaying an image thereon and a see-through function for allowing the user to see the external world therethrough. In this instance, since the eyeglasses type image display apparatus has a see-through function, then there is an advantage that, if the eyeglasses type image display apparatus is connected to a computer, while the user looks at an image displayed on the eyeglasses type image display apparatus, the user can directly look at and operate a keyboard or the like of the computer.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
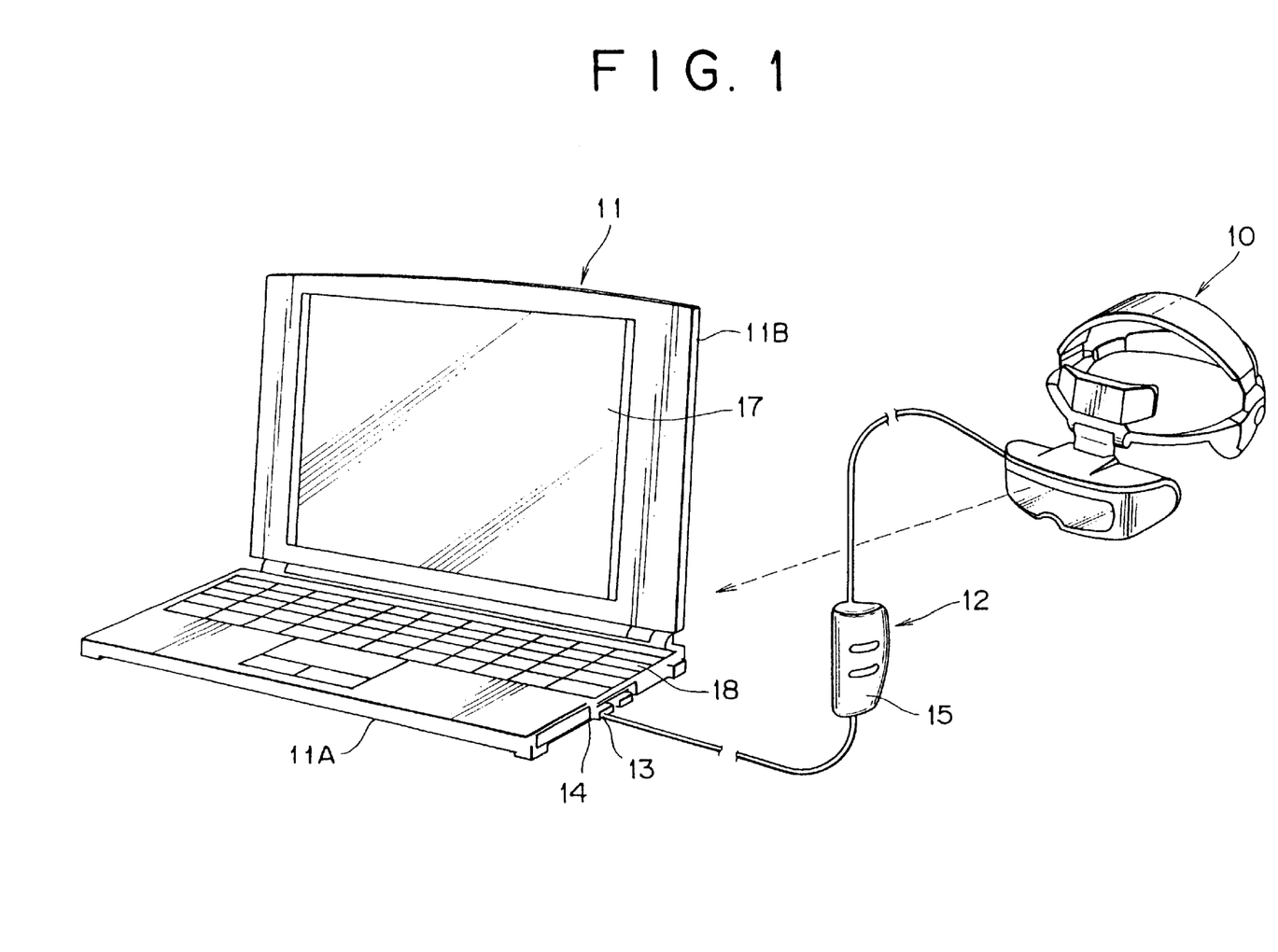
FIG. 1 is a perspective view of an eyeglasses type image display apparatus to which the present invention is applied in a condition that it is connected to a computer.

Referring first to FIG. 1, there is shown an eyeglasses type image display apparatus to which the present invention is applied. The eyeglasses type image display apparatus shown is generally denoted at 10 and includes a means for connecting the eyeglasses type image display apparatus 10 itself to a computer 11 by a wire or cable, that is, a connection section 12 including a remote controller 15 provided intermediately thereof.

The connection section 12 is provided with a connector 13 provided at a free end portion thereof, such that it can be connected to an external display connector 14 of the computer 11 and can transmit a remote controlling operation from the remote controller 15 at the intermediate location thereof.

The computer 11 is a so-called lap top type computer, having a base member 11A, a lid member 11B mounted for pivotal opening and closing movement on the base member 11A, a display unit 17 provided on the lid member 11B, a keyboard 18 provided on the base member 11A, and the external display connector 14 provided on a side wall of the base member 11A. The external display connector 14 is made of a high density D-sub 15-pin connector.

Figure 2:
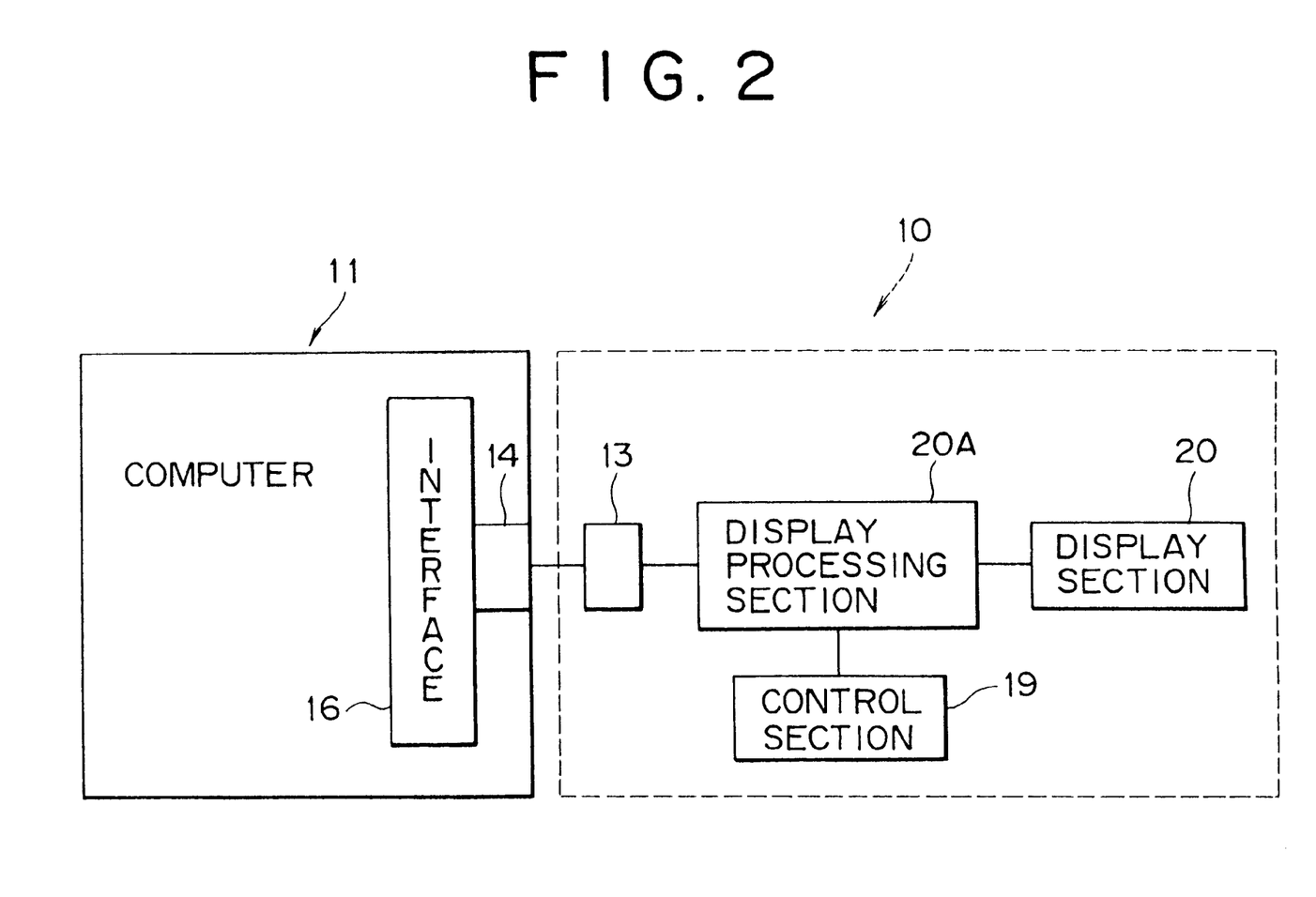
FIG. 2 is a block diagram showing an electric construction of the eyeglasses type image display apparatus and the computer of FIG. 1.

FIG. 2 shows an electric construction of the eyeglasses type image display apparatus 10 and the computer 11 connected to each other.

Referring to FIG. 2, the external display connector 14 of the computer 11 is connected to an interface 16 in the inside of the computer 11. The interface 16 is connected to an information processing section not shown in the inside of the computer 11. When the computer 11 is connected to the eyeglasses type image display apparatus 10, power supply to the display unit 17 (refer to FIG. 1) is interrupted.

The eyeglasses type image display apparatus 10 includes a connector 13 for connecting to the external display connector 14 of the computer 11, a display processing section 20A, a control section 19 and a display section 20. The connector 13 is constructed in similar standards to those of the external display connector 14 of the computer 11.

The connector 13 can receive an image signal (R, G, B and HV signals or the like) from the computer 11 side and sends the received image signal to the display processing section 20A. The image signal sent to the display processing section 20A is then sent to the display section 20 in accordance with an instruction of the control section 19 and displayed as an image on the display section 20. The display processing section 20A converts the image signal into a signal of a format suitable to the display section 20 and outputs the converted signal to the display section 20. The display section 20 has a structure which allows an image of a high resolution complying to, for example, the SVGA (Super Video Graphics Array) standards of 600 (V)×800 (H) to be displayed thereon.

The control section 19 controls the entire system of the eyeglass type image display apparatus 10 and processes an operation of the remote controller or the like to control the display processing section 20A. It is to be noted that components for an audio signal are omitted in FIG. 2.

Figure 3:
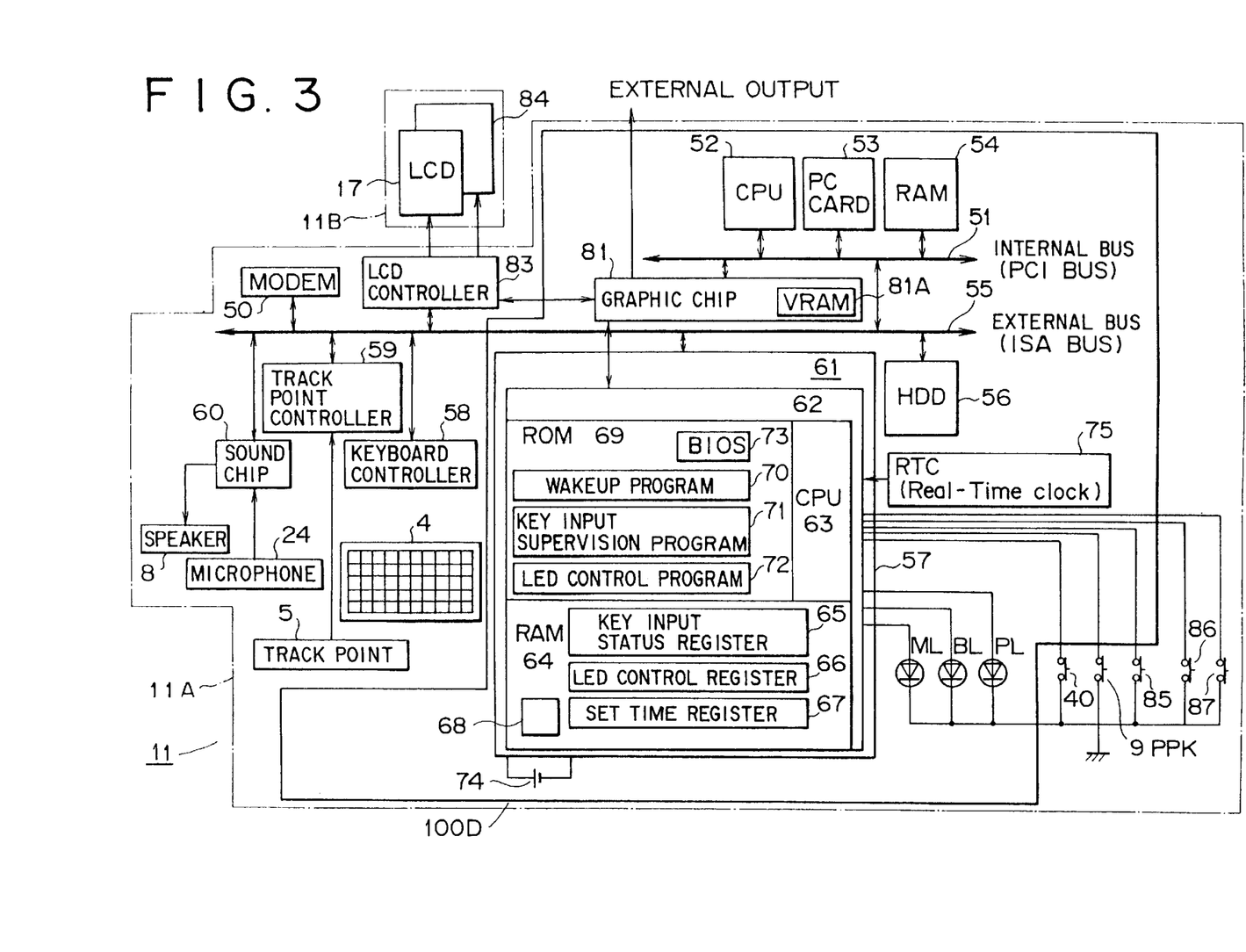
FIG. 3 is a block diagram showing a more detailed electric construction of the computer shown in FIG. 2.

FIG. 3 shows a detailed construction of the computer 11. The computer 11 includes a CPU 52 connected through an internal bus (PCI bus), 51 to a graphics chip 81 and further to an LCD controller 83, by which the display (LCD: liquid crystal display) unit 17 is controlled to display an image. The graphics chip 81 generates an image and outputs it to an output terminal (the connector 14 shown in FIG. 1) so that it is outputted to the outside of the computer 11.

Figure 5:
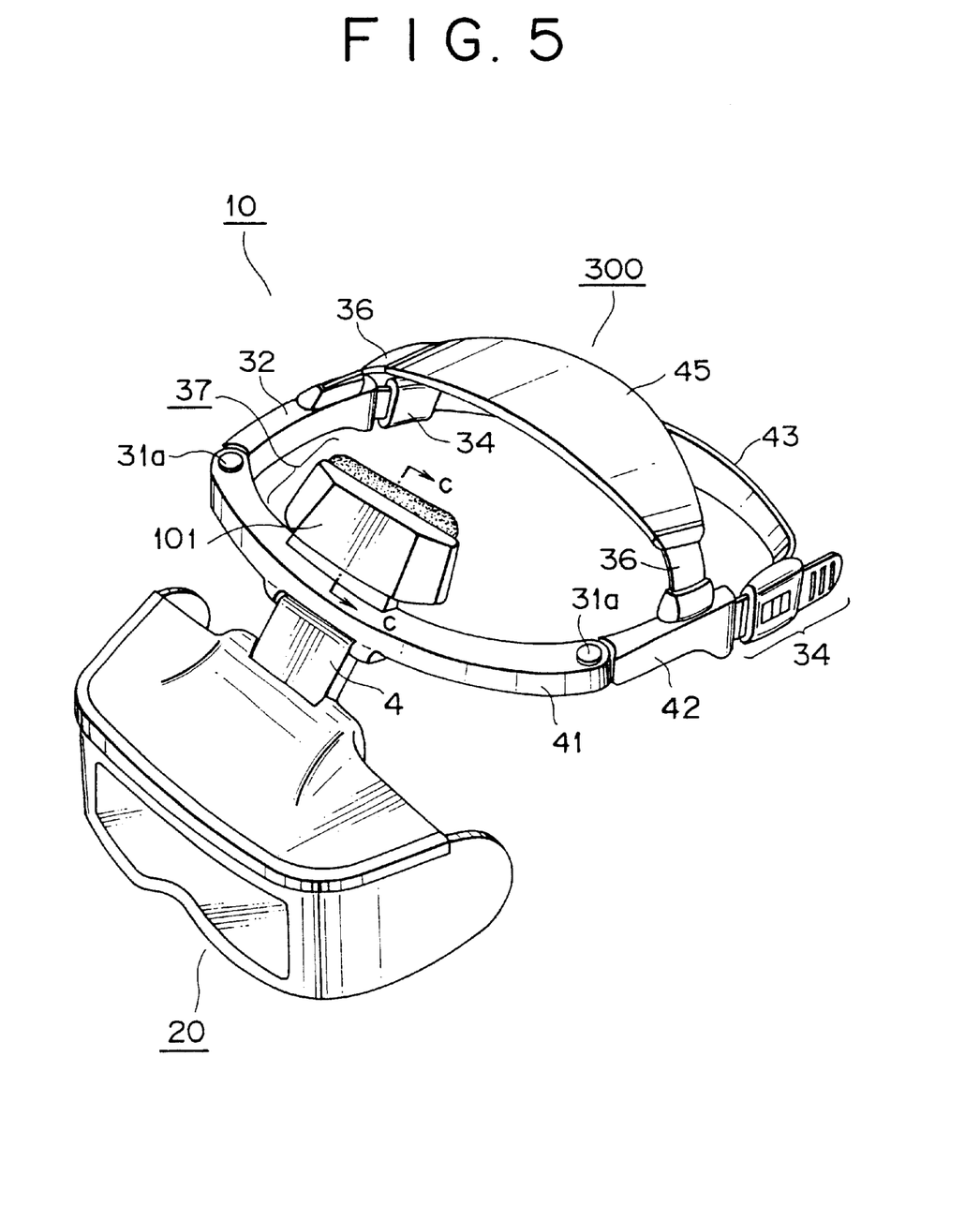
FIG. 5 is a perspective view showing a mechanical construction of the eyeglasses type image display apparatus shown in FIG. 1.

That is, the computer 11 shown in FIG. 1 has the construction shown in FIG. 3, and the computer which does not include the display unit of FIG. 5 corresponds to the computer of FIG. 3 from which the LCD controller 83 and the LCD unit 17 are removed.

It is to be noted that an image to be outputted from the graphics chip 81 to the outside may be transmitted alternatively by radio.

Figure 4:
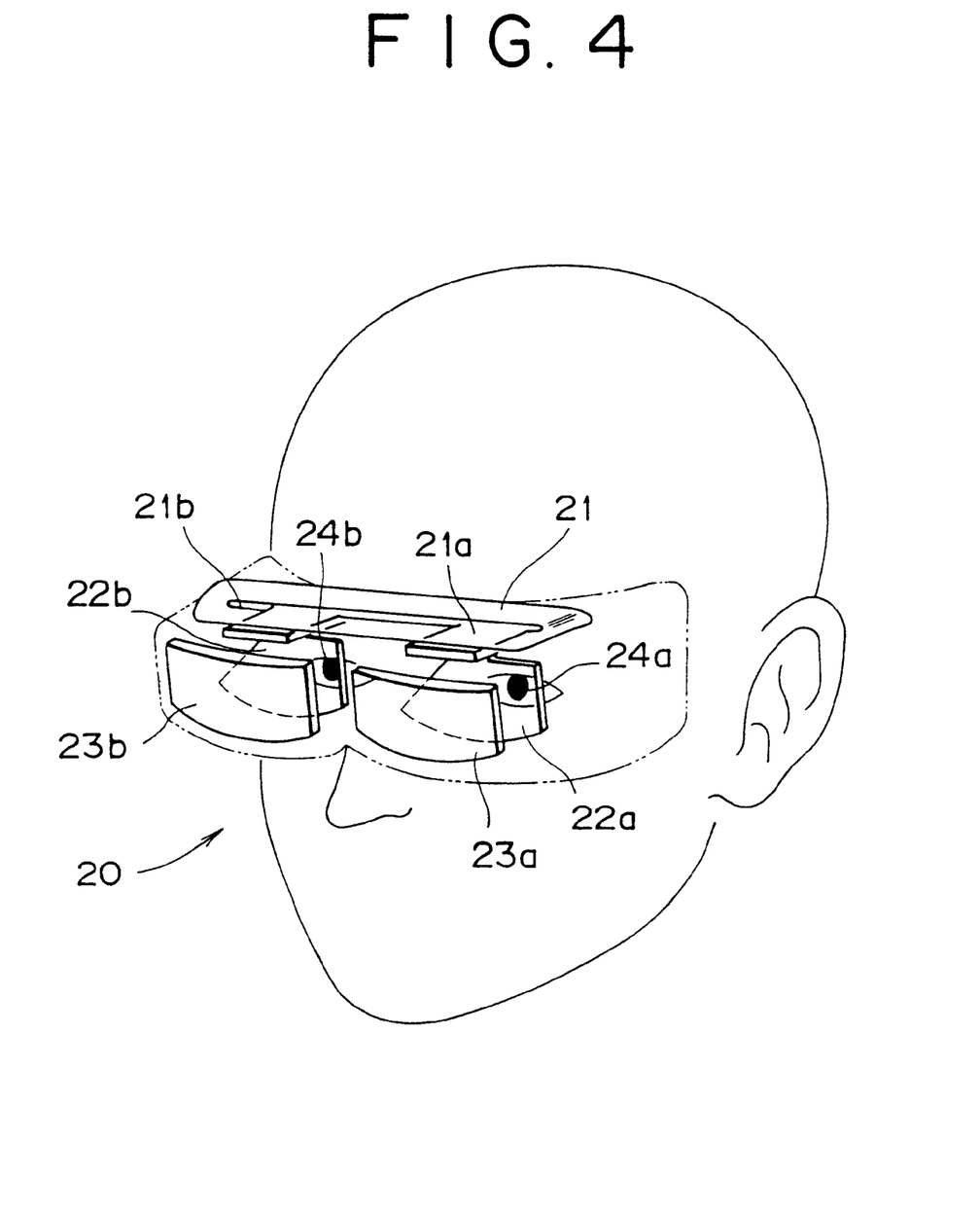
FIG. 4 is a schematic illustration showing a general construction of a display section of the eyeglasses type image display apparatus shown in FIG. 1.

The display section 20 of the eyeglasses type image display apparatus 10 has such a structure as shown in FIG. 4. Referring to FIG. 4, the display section 20 includes a back light 21, a pair of LCDs 21a and 21b which are liquid crystal display panels for the left and right eyes, a pair of half mirrors 22a and 22b for the left and right eyes, and a pair of concave half mirrors 23a and 23b for the left and right eyes, respectively.

The back light 21 illuminates the LCDs 21a and 21b for the left and right eyes from above, and an image for the left eye is displayed on the LCD 21a for the left eye while an image for the right eye is displayed on the LCD 21b for the right eye.

Images displayed on the LCDs 21a and 21b are reflected by the half mirrors 22a and 22b, and enlarged and reflected by the half mirrors 23a and 23b, respectively. Then, the images are come back to the half mirrors 22a and 22b passing through them again and focused on user's eyes 24a and 24b. Accordingly, the images focused on the user's eyes 24a and 24b are virtually displayed via the half mirrors 22a and 22b.

The size of the screen observed by the user's eyes 24a and 24b in this manner can be represented by a ratio between the angle of visibility when the images of the LCDs 21a and 21b enter the user's eyes 24a and 24b, respectively, and the total angle of visibility observed by the user's eyes 24a and 24b. For example, where the angle of visibility is set to 30 degrees, a virtual image distance of 2 meters is obtained which corresponds to a large screen of the 52-inch size being observed by the user.

The concave half mirrors 23a and 23b have a see-through function of passing light therethrough, therefore, while the user observes an image from the LCDs 21a and 21b, the user can see a manner of the external world which can be seen with the ordinary eyes 24a and 24b simultaneously, (in the directions indicated by arrow marks L and R, respectively).

Figure 6:
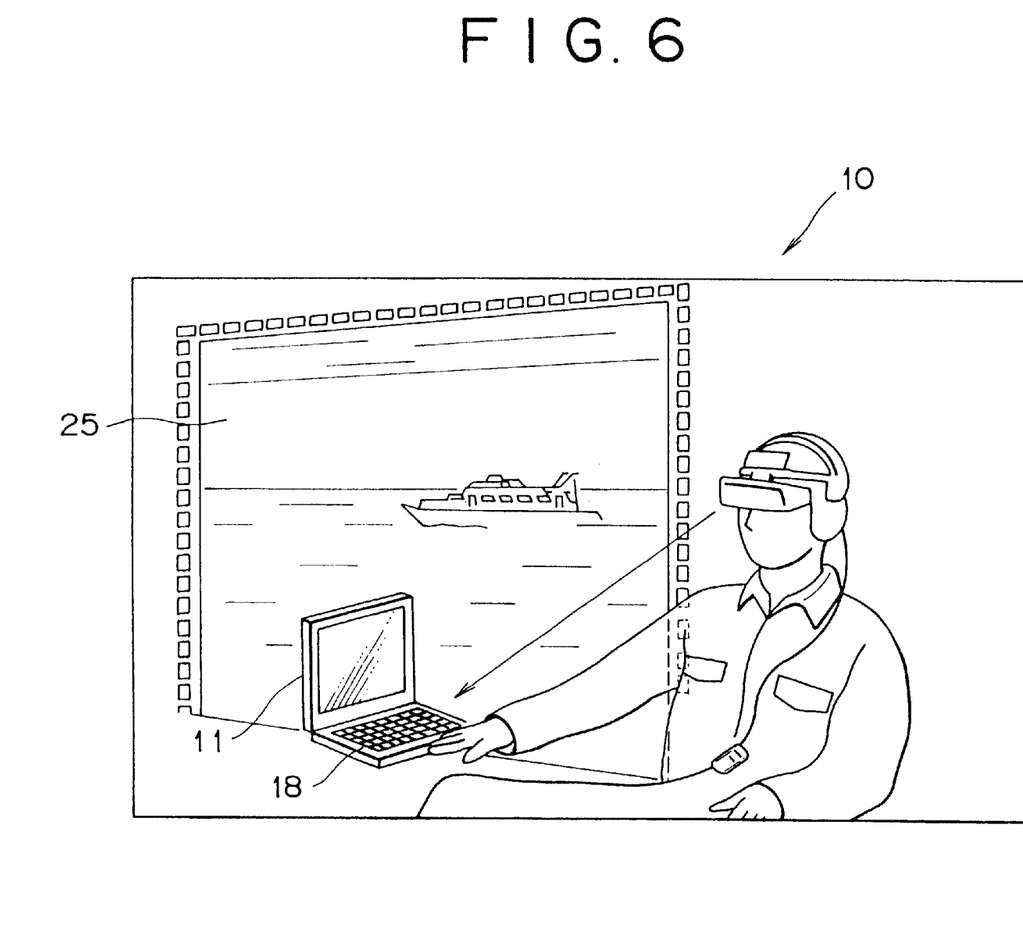
FIG. 6 is a perspective view showing a screen actually displayed by the eye glasses type image display apparatus of FIG. 1 and illustrating a manner in which the computer shown in FIG. 1 is operated through a keyboard.

According to the see-through function of the concave half mirrors 23a and 23b, when a user sees an image displayed on the display section of the computer 11 connected to the eyeglasses type image display apparatus 10 as seen in FIG. 6, the user can see the image on a body sensory large screen 25 and see the external world simultaneously. Therefore, the user can look directly at and operate the keyboard 18. In other words, the user can operate the actual keyboard 18 of the computer 11 while seeing the screen 25, utilizing the see-through function, thus the user does not have such a feeling that the screen display and the position at which an inputting operation is performed are physically spaced away from each other. Since the image displayed on the screen 25 has a construction which satisfies the SVGA standards of 600 (v)×800 (H), the image is displayed in a high resolution.

The see-through function not only can be applied to such an operation of the keyboard 18 as described above but also can be applied, for example, to an operation for maintenance or the like while information of a working manual or the like received from the computer 11 is displayed on the LCDs 21a and 21b. Where the eyeglasses type image display apparatus 10 is constructed such that it is connected to the computer 11 so as for abundant information of the computer 11 to be displayed on the LCDs 21a and 21b, so that an operation or the like can be performed simultaneously while observing the external world. By employing such construction, the convenience is improved remarkably.

FIG. 5 shows a mechanical construction of the eyeglasses type image display apparatus 10 described hereinabove. The eyeglasses type image display apparatus 10 includes a mounting member 300 including a front frame 41, a pair of side frames 42 and a belt 43 for being fitted on the head of a user. The mounting member 300 further has a pad 101 and a head pad 45 for being pressed against the head of the user to fix the mounting member 300 to the head of the user when the mounting member 300 is fitted on the head.

The display unit 20 is connected to the mounting member 300 and has such a construction as described hereinabove with reference to FIG. 4. Where the eyeglasses type image display apparatus 10 of FIG. 5 is used in such a manner as shown in FIG. 5, it includes a signal receiver for receiving a radio signal from the computer 11 and displays the signal on the display unit 20.

Figure 7A:
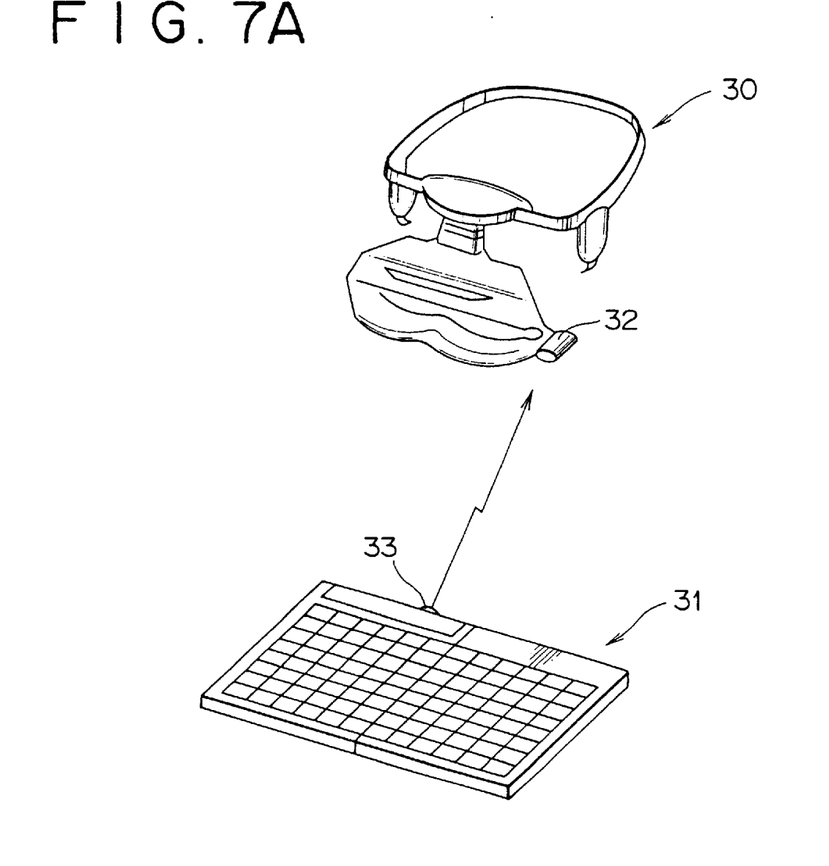
FIG. 7A is a perspective view of another eyeglasses type image display apparatus to which the present invention is applied in a condition that it is connected to a computer by radio.
Figure 7B:
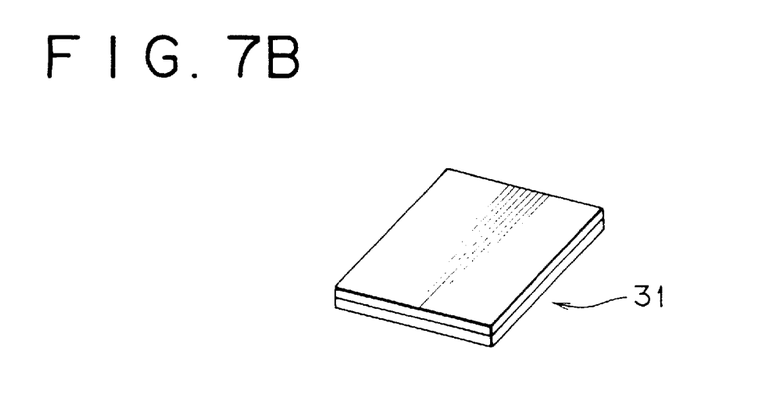
FIG. 7B is a perspective view showing the eyeglasses type image displayed apparatus in a folded condition.
Figure 8:
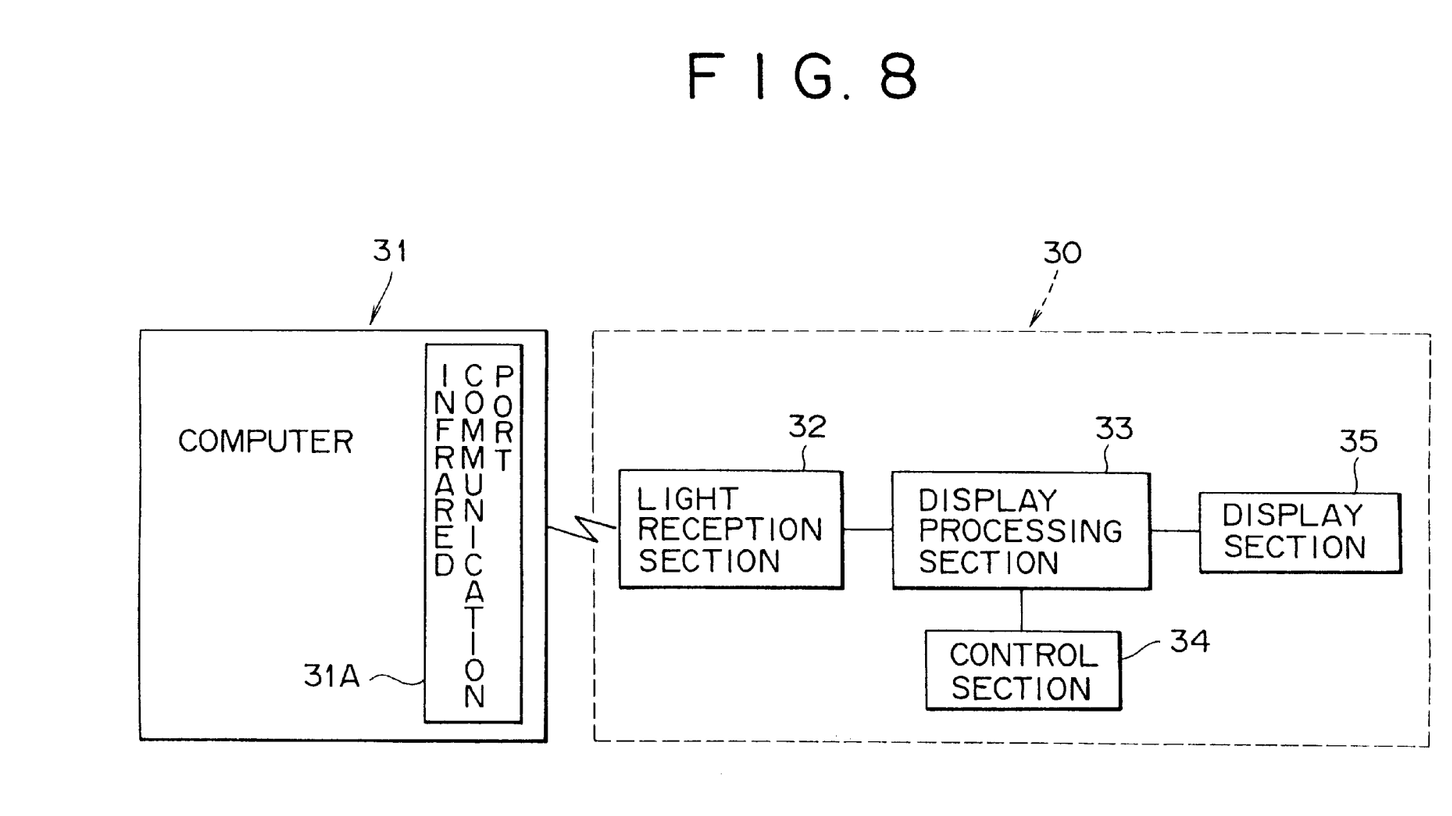
FIG. 8 is a block diagram showing an electric construction of the eyeglasses type image display apparatus and the computer shown in FIG. 7A.

Referring now to FIGS. 7A, 7B and 8, there is shown another eyeglasses type image display apparatus to which the present invention is applied.

The eyeglasses type image display apparatus is generally denoted at 30 including a means for connecting the eyeglasses type image display apparatus 30 itself to a computer 31 by radio, that is, a light reception section 32 for receiving data conveyed by infrared rays. The computer 31 does not have a display function and is so structured that it can be folded on itself when it is not used (refer to FIG. 7B).

The computer 31 includes an infrared communication port 31A which can send out video and audio information of predetermined standards (for example, the IrDA standards) to the eyeglasses type image display apparatus 30 by radio.

FIG. 8 illustrates a connection condition of the computer 31 and the eyeglasses type image display apparatus 30. Referring to FIG. 8, the infrared communication port 31A of the computer 31 is connected to an information processing section not shown in the inside of the computer 31.

The light reception section 32 of the eyeglasses type image display apparatus 30 receives an optical signal including video and audio information from the infrared communication port 31A of the computer 31 and sends the video and audio information of the received signal to a display processing section 33. The image signal and so forth sent to the eyeglasses type image display apparatus 30 are sent to a display section 35 in accordance with an instruction of a control section 34 and displayed as an image on the display section 35. The display processing section 33 converts the image signal and so forth into a data format suitable for the display section 35 and outputs the resulting data. Further, the display section 35 is so structured that it can display an image of a high resolution complying to the SVGA standards of, for example, 600 (V)×800 (H). The structure of the display section 35 is similar to that of the display section 20 described hereinabove with reference to FIG. 4, and accordingly, overlapping description is omitted hereinunder to avoid redundancy.

The control section 34 controls the entire system of eyeglasses type image display apparatus 30 as well as instructing a light emitting element not shown to send video and audio information to the computer 31 side.

In the system including the computer 31 and the eyeglasses type image display apparatus 30 having such a construction as described above, the computer 31 frequency multiplexes and brightness modulates video and audio information in accordance with an instruction from the control section 34 and irradiates resulting information as infrared rays.

The light reception section 32 receives and accepts the video and audio information, and the received video and audio information is band demultiplexed and demodulated by a means of a demodulation section not shown of the display processing section 33. Then, resulting video information is displayed on the display section 35.

Since video and audio information is transmitted by radio in this manner, the computer 31 can be constructed compact and the degree of freedom in installation of the eyeglasses type image display apparatus 30 can be augmented.

While preferred embodiments of the present invention have been described using specific terms, such description is for illustrative purpose only, and it is to be understood that changes and variations may be made without departing from the spirit or scope of the following claims.

What is claimed is:

1. An eyeglasses type image display apparatus for being mounted on a head of a user to display an image in front of eyes of the user, the apparatus comprising:
   a) connector configured to receive information from a computer therethrough;
   b) a processor configured to process the information received through said connector; and
   c) a display assembly configured to display an image based on the information processed by said processor while allowing the user to see the external world, the display assembly including:
      1) a display screen that emits an original image;
      2) a first half-mirror that is configured and arranged to partially reflect the original image from the display screen toward a second half-mirror, and to partially transmit toward the user's eye, an enlarged image that is returned from the second half-mirror;
      3) the second half-mirror, constituting a curved half-mirror that is configured and arranged to enlarge the original image reflected by the first half-mirror and to return the enlarged image toward the first half-mirror;
      4) a second display screen that emits a second original image;
      5) a third half-mirror that is configured and arranged to partially reflect the second original image from the second display screen toward a fourth half-mirror, and to partially transmit toward the user's second eye, a second enlarged image that is returned from the fourth half-mirror; and
      6) the fourth half-mirror, constituting a second curved half-mirror that is configured and arranged to enlarge the second original image reflected by the third half-mirror and to return the second enlarged image toward the third half-mirror;
         wherein the user can see both the enlarged returned image and the external world through the first and second half-mirrors; and
         wherein the user can see both the second enlarged returned image and the external world through the third and fourth half-mirrors.

2. An eyeglass type image display apparatus according to claim 1, further comprising:
   a ring-shaped mounting section configured to be fitted with a head of the user, said ring-shaped mounting section including a pad for being pressed against the head of the user to mount said eyeglasses type image display apparatus in position on the head of the user;

wherein said display assembly is connected to said ring-shaped mounting section so as to be positioned in front of the eyes of the user when said eyeglass type image display apparatus is mounted in position on the head of the user.

3. An eyeglasses type image display apparatus according to claim 1, wherein said connector includes a wire configured to transmit information therethrough.

4. An eyeglasses type image display apparatus according to claim 1, wherein said connector includes a wireless transmission device configured to convey the information, the wireless transmission device including:

a light receiver configured to receive data conveyed by infrared rays and to send the data to a display processing section.

* * * * *